United States Patent
Chang

(10) Patent No.: US 9,256,777 B2
(45) Date of Patent: Feb. 9, 2016

(54) METHOD FOR RECOGNIZING GESTURE AND ELECTRONIC DEVICE

(71) Applicant: Wistron Corporation, New Taipei (TW)

(72) Inventor: Wen-Yung Chang, New Taipei (TW)

(73) Assignee: Wistron Corporation, New Taipei (TW)

( * ) Notice: Subject to any disclaimer, the term of this patent is extended or adjusted under 35 U.S.C. 154(b) by 481 days.

(21) Appl. No.: 13/688,215

(22) Filed: Nov. 29, 2012

(65) Prior Publication Data

US 2014/0119596 A1    May 1, 2014

(30) Foreign Application Priority Data

Oct. 31, 2012    (TW) .............................. 101140343 A

(51) Int. Cl.
*G06K 9/00*    (2006.01)

(52) U.S. Cl.
CPC ........ *G06K 9/00335* (2013.01); *G06K 9/00375* (2013.01)

(58) Field of Classification Search
CPC . G06K 9/00355; G06K 9/00335; G06F 3/017
See application file for complete search history.

(56) References Cited

U.S. PATENT DOCUMENTS

| | | | | |
|---|---|---|---|---|
| 6,819,782 B1* | 11/2004 | Imagawa et al. | ............... | 382/115 |
| 7,593,552 B2* | 9/2009 | Higaki et al. | ................. | 382/118 |
| 7,949,157 B2* | 5/2011 | Afzulpurkar et al. | ......... | 382/115 |
| 8,290,210 B2* | 10/2012 | Fahn | ........................ | G06F 3/017 |
| | | | | 382/103 |
| 8,837,780 B2* | 9/2014 | Jia et al. | .......................... | 382/103 |
| 2005/0238201 A1* | 10/2005 | Shamaie | ........................ | 382/103 |
| 2008/0013793 A1* | 1/2008 | Hillis et al. | ..................... | 382/114 |
| 2009/0231096 A1* | 9/2009 | Bringer et al. | ................ | 340/5.82 |
| 2009/0232353 A1 | 9/2009 | Sundaresan et al. | | |
| 2009/0309848 A1* | 12/2009 | Terada et al. | .................. | 345/173 |
| 2009/0324008 A1* | 12/2009 | Kongqiao et al. | ............. | 382/103 |
| 2010/0021014 A1* | 1/2010 | Bebis | .................. | G06K 9/00375 |
| | | | | 382/115 |
| 2010/0197390 A1 | 8/2010 | Craig et al. | | |
| 2010/0322486 A1* | 12/2010 | Bebis | .................... | G06K 9/6292 |
| | | | | 382/115 |
| 2010/0329509 A1* | 12/2010 | Fahn et al. | ...................... | 382/103 |
| 2012/0069168 A1* | 3/2012 | Huang et al. | .................... | 348/77 |
| 2013/0278501 A1* | 10/2013 | Bulzacki | ........................ | 345/157 |
| 2014/0071042 A1* | 3/2014 | Eilat | ................. | 345/156 |
| 2014/0119596 A1* | 5/2014 | Chang | ................ | G06K 9/00375 |
| | | | | 382/103 |
| 2014/0168074 A1* | 6/2014 | Lim et al. | ........................ | 345/156 |
| 2015/0253863 A1* | 9/2015 | Babin | ..................... | G06F 3/017 |
| | | | | 345/156 |

FOREIGN PATENT DOCUMENTS

| | | |
|---|---|---|
| TW | 200911063 | 3/2009 |
| TW | 201101197 | 1/2011 |

OTHER PUBLICATIONS

"Office Action of Taiwan Counterpart Application", issued on Sep. 26, 2014, p. 1-p. 7 with partial English translation.

* cited by examiner

*Primary Examiner* — Gandhi Thirugnanam

(74) *Attorney, Agent, or Firm* — Jianq Chyun IP Office

(57) ABSTRACT

A method for recognizing a gesture adopted by an electronic device to recognize a gesture of at least a hand. In the method, a hand image of the hand is captured and the hand image includes a hand region. A geometric center of the hand region is calculated. At least a concentric circle is disposed on the hand region with the geometric center as the center of the concentric circles. A number of intersection points of each concentric circle and the hand region is calculated respectively to determine a feature vector of the gesture. According to the feature vector, a hand recognition is performed to recognize the gesture of the hand.

12 Claims, 6 Drawing Sheets

METHOD FOR RECOGNIZING GESTURE AND ELECTRONIC DEVICE

CROSS-REFERENCE TO RELATED APPLICATION

This application claims the priority benefit of Taiwan application serial no. 101140343, filed on Oct. 31, 2012. The entirety of the above-mentioned patent application is hereby incorporated by reference herein and made a part of this specification.

BACKGROUND OF THE INVENTION

1. Field of Invention

The present invention relates to a recognizing method and an electronic device. More particularly, the present invention relates to a method for recognizing gestures and an electronic device.

2. Description of Related Art

Conventionally, the human-computer interaction interfaces include mousse, keyboard and joy stick and with the developments of the technologies, the touch screens are widely used in various electronic products to be the human-computer interaction interface. To improve the humanity of the human-computer interaction interface, the motion sensing control providing a whole new input method and one of the human sensing control is gesture recognition. Since the gesture is a very original and natural way to express meanings, gestures become one of the communication method between people in daily life. The fields including the design of the human-computer interaction interface, medical rehabilitation, virtual reality, digital art creation and game design which gesture recognition is applied to are gradually attracting the consumers' attentions.

The information of the gestures to be recognized includes a dynamic gesture information and a static gesture information. The dynamic gesture information includes the motion track of the hand, the position information and sequence relationship in time. Further, the static information includes hand appearance changes. By analyzing the gesture information and according to the different gestures, the function of the human-computer interaction can be achieved. One of the gesture recognition methods is that the images captured by the camera lens and depth sensor is inputted into the computer and each of the images should go through an image pre-processing (such as image thresholding and background eliminating from the image) to collect and analyze the position of the user's hand and gesture information. Thus, typically, it spends much time in the image pre-processing and the noise-to-signal ratio of the gesture feature is relatively high. Therefore, it raises the challenge level for implementing the human-computer interaction.

SUMMARY OF THE INVENTION

The invention provides a method for recognizing gestures capable of decreasing the complexity of the data processing.

The invention provides an electronic device capable of increasing the instantaneity of the human-computer interaction.

To achieve these and other advantages and in accordance with the purpose of the invention, as embodied and broadly described herein, the invention provides a method of recognizing a gesture for an electronic device to recognize a gesture of at least one hand. In the method, a hand image of the hand is captured, wherein the hand image includes a hand region. A geometric center of the hand region is calculated. At least a concentric circle is deployed on the hand image with the geometric center as a center of the concentric circles. A number of a plurality of intersection points of each of the concentric circles and the hand region is calculated respectively to determine a feature vector of the gesture. According to the feature vector, a hand recognition is performed to recognize the gesture of the hand.

According to one embodiment of the present invention, the step of deploying the concentric circles on the hand image comprises: regarding a distance between the geometric center and a wrist joint of the hand in the hand image as a maximum radius and evenly deploying the concentric circles within a range corresponding to the maximum radius with the geometric center as the center, wherein the maximum radius is divided by a number of the concentric circles is larger than or equal to 1.

According to one embodiment of the present invention, the feature vector includes a plurality of components and each of the components corresponds to one of the concentric circles and the number of the intersection points of the concentric circle to the hand region is equal to the component corresponding to the concentric circle.

According to one embodiment of the present invention, the electronic device comprises a storage device recording a plurality of standard gestures and a plurality of standard vectors respectively corresponding to the standard gestures, and the gesture recognition comprises: evenly dividing the components in the feature vector to form a plurality of sub-vectors, calculating an average component value of each of the sub-vectors, sampling at least one of the average component values respectively corresponding to the sub-vectors to form an average vector, calculating an error value between the average vector and each of the standard vectors and according to the error values, determining the gesture corresponding to the hand image. Moreover, the step of evenly dividing the components in the feature vector comprises: using twenty percentage of a number of the concentric circles as a dividing basis, evenly dividing the components in the feature vector to respectively form the sub-vectors.

According to one embodiment of the present invention, the electronic device comprises a storage device and the storage device records a plurality of standard gestures and a plurality of intersection point ranges respectively corresponding to the standard gestures, and the gesture recognition comprises: according to the feature vector, determining a maximum component among the components in the feature vector, and sampling all concentric circles between the concentric circle corresponding to the maximum component and the concentric circle corresponding to a sub-maximum radius, wherein the sub-maximum radius is only smaller than a maximum radius which is a distance between the geometric center and a wrist joint of the hand in the hand image. The components respectively corresponding to the sampled concentric circles are averaged to obtain an average number of the intersection points. According to the intersection point ranges recorded in the storage device, the average number of the intersection points is determined to be within one of the intersection point ranges. The standard gesture corresponding to the determined intersection point range is determined to be the gesture corresponding to the hand image.

The invention further provides an electronic device having an image capturing device, a storage device and a processor. The image capturing device captures a hand image of the hand, wherein the hand image includes a hand region. The storage device stores a computer readable and writable software. The processor executes a plurality of commands of the computer readable and writable software. The commands comprises: calculating a geometric center of the hand region, deploying at least a concentric circle on the hand image with the geometric center as a center of the concentric circles, calculating a number of a plurality of intersection points of each of the concentric circles and the hand region respectively to determine a feature vector of the gesture and according to the feature vector, performing a hand recognition to recognize the gesture of the hand.

According to one embodiment of the present invention, the command of deploying the concentric circles on the hand image comprises: 以 regarding a distance between the geometric center and a wrist joint of the hand in the hand image as a maximum radius and evenly deploying the concentric circles within a range corresponding to the maximum radius with the geometric center as the center, wherein the maximum radius is divided by a number of the concentric circles is larger than or equal to 1.

According to one embodiment of the present invention, the feature vector includes a plurality of components and each of the components corresponds to one of the concentric circles and the number of the intersection points of the concentric circle to the hand region is equal to the component corresponding to the concentric circle.

According to one embodiment of the present invention, the storage device records a plurality of standard gestures and a plurality of standard vectors respectively corresponding to the standard gestures, and the gesture recognition comprises: evenly dividing the components in the feature vector to form a plurality of sub-vectors, calculating an average component value of each of the sub-vectors, sampling at least one of the average component values respectively corresponding to the sub-vectors to form an average vector, calculating an error value between the average vector and each of the standard vectors and according to the error values, determining the gesture corresponding to the hand image. Moreover, the command of evenly dividing the components in the feature vector comprises: using twenty percentage of a number of the concentric circles as a dividing basis, evenly dividing the components in the feature vector to respectively form the sub-vectors.

According to one embodiment of the present invention, the storage device records a plurality of standard gestures and a plurality of intersection point ranges respectively corresponding to the standard gestures, and the gesture recognition comprises: according to the feature vector, determining a maximum component among the components in the feature vector and sampling all concentric circles between the concentric circle corresponding to the maximum component and the concentric circle corresponding to a sub-maximum radius, wherein the sub-maximum radius is only smaller than a maximum radius which is a distance between the geometric center and a wrist joint of the hand in the hand image. The components respectively corresponding to the sampled concentric circles are averaged to obtain an average number of the intersection points. According to the intersection point ranges recorded in the storage device, the average number of the intersection points is determined to be within one of the intersection point ranges. The standard gesture corresponding to the determined intersection point range is determined to be the gesture corresponding to the hand image.

Accordingly, the concentric circles are deployed on the hand region of the gesture in the present invention. According to the number of the intersection points of the hand region and each of the concentric circles, the feature vector corresponding to the actual gesture is determined. Then, by using the feature vector, the gesture is recognized. Comparing with the conventional method in which a longest distance between the geometric center of the hand region and each of the points at the edge of the hand region in 360 degrees is calculated and the feature vector is obtained according to the data of the longest distances, the feature vector of the present invention represents the feature of the gesture, which is capable of simplifying the complexity of the data processing. Thus, the instantaneity of the human-computer interaction can be improved.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
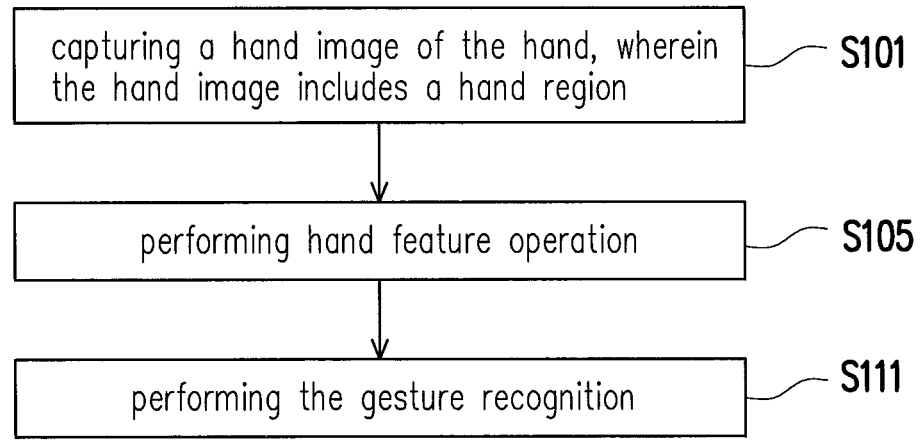
FIG. 1 is a flow chart showing a gesture recognition method according to one embodiment of the present invention.

FIG. 1 is a flow chart showing a gesture recognition method according to one embodiment of the present invention. As shown in FIG. 1, the present embodiment is used for an electronic device to recognize a gesture of at least one hand. In the step S101, a hand image of the hand is captured, wherein the hand image comprises a hand region. More specifically, after the hand image of the hand is captured, an image process (including analyzing the depth image from the hand image, adjusting the contrast of the depth image, deleting the background and recognizing the hand information) is performed to analyze the hand region of the hand image.

Then, in the step S105, a hand feature operation is performed to obtain a feature vector of the gesture. Thereafter, in the step S115, according to the feature vector, the gesture of the hand is recognized.

Figure 2:
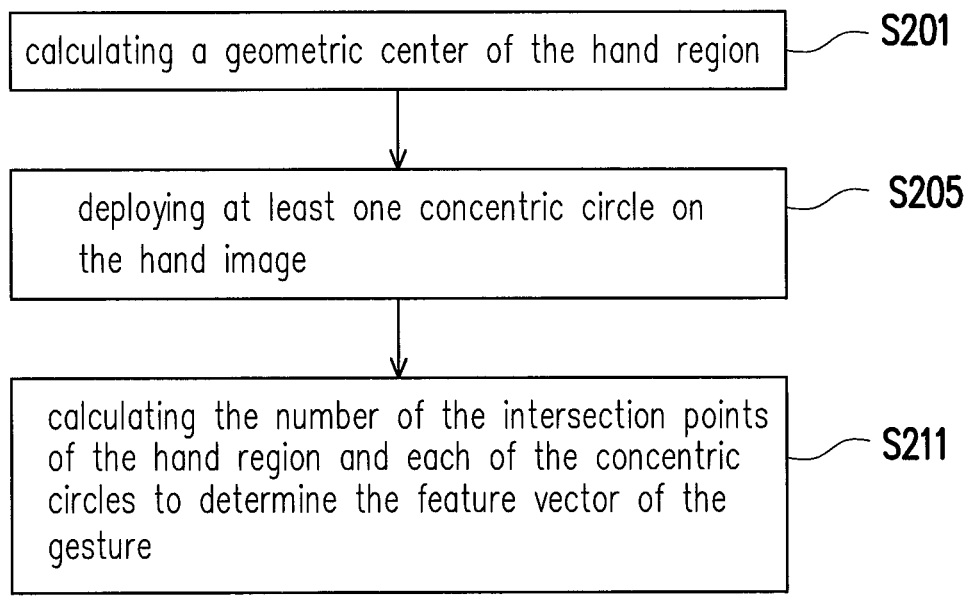
FIG. 2 is a flow chart showing a hand feature calculation according to one embodiment of the present invention.
Figure 3A:
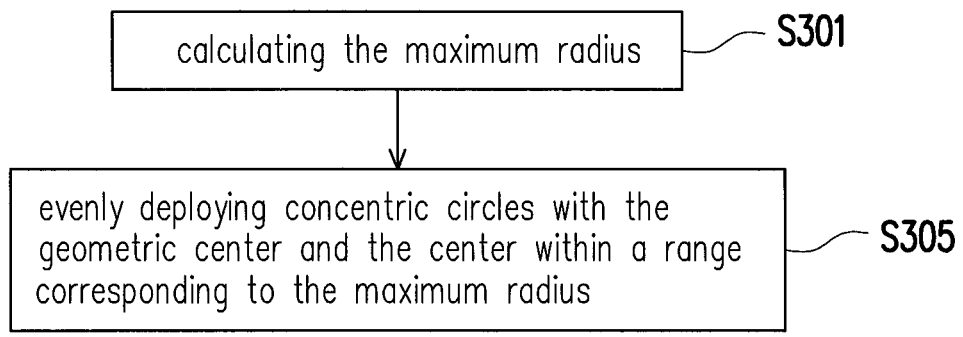
FIG. 3A is a flow chart showing a process for deploying concentric circles on the hand image according to one embodiment of the present invention.
Figure 3B:
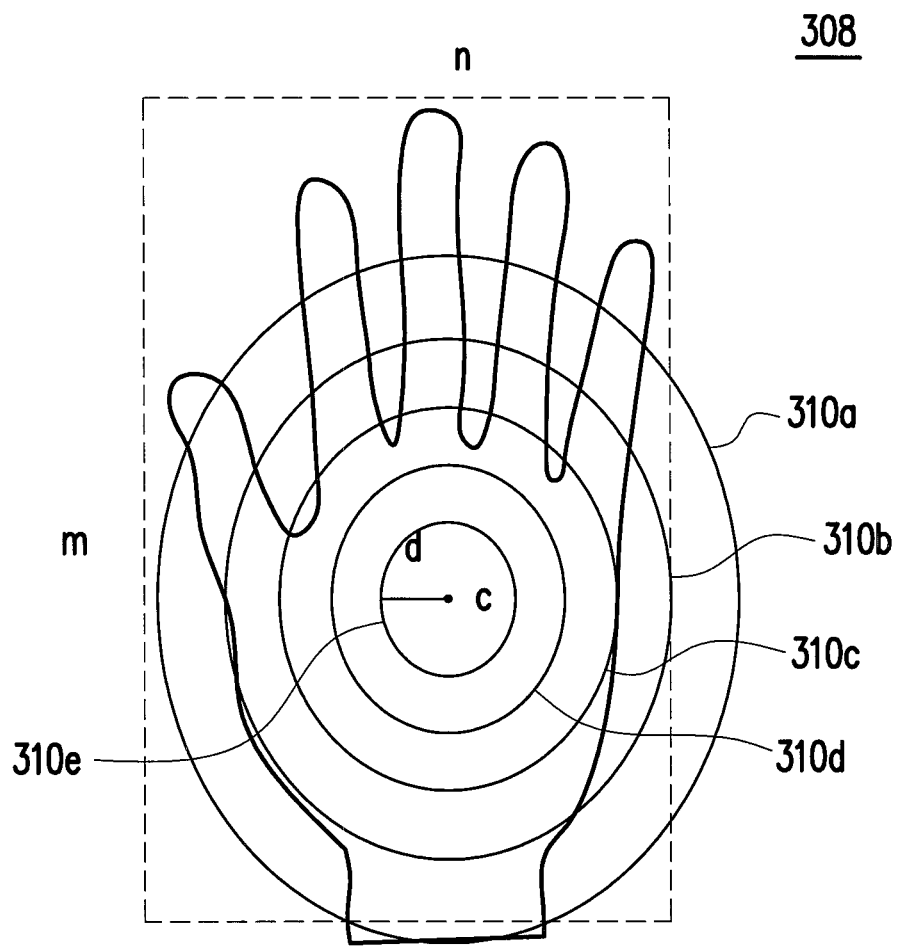
FIG. 3B is a schematic diagram showing a hand image having concentric circles deploying thereon according to one embodiment of the present invention.

The aforementioned step S105 of hand feature operation is further illustrated in an embodiment in the following paragraph. FIG. 2 is a flow chart showing a hand feature calculation according to one embodiment of the present invention. As shown in FIG. 2, in the step S201, a geometric center of the hand region is calculated. For instance, after a binary image of the hand region is analyzed, the geometric center c(xc, yc) (such as the geometric center c of the hand region shown in FIG. 3B) of the hand region is calculated. When the resolution of the binary image is n×m (as shown in FIG. 3B), area A of the hand region is calculated according to formula 1.

$$b(i, j) = \begin{cases} 1 \\ 0 \end{cases} A = \sum_{i=1}^{n} \sum_{j=1}^{m} b(i, j). \quad \text{formula 1}$$

In formula 1, i represents the width of the resolution of the binary image, j represents the length of the resolution of the binary image and b(i, j) represents a binary value of each of the pixels in the binary image. When the binary value of the pixel which is within the hand region is 1, the binary value of the pixel which is not in the hand region is 0.

Thereafter, xc, which is the coordinate of the geometric center of the hand region at the X axis, is calculated according to the formula 2, and yc, which is the coordinate of the geometric center of the hand region at the Y axis, is calculated according to the formula 3.

$$x_c = \frac{\sum_{i=1}^{n} \sum_{j=1}^{m} j \times b(i, j)}{A} \quad \text{formula 2}$$

$$y_c = \frac{\sum_{i=1}^{n} \sum_{j=1}^{m} i \times b(i, j)}{A} \quad \text{formula 3}$$

Then, in the step S205, at least one concentric circle is deployed on the hand image with the geometric center c(xc, yc) as a center of the concentric circle. In other words, the circle-number concentric circles are deploying on the hand image, for example. As shown in FIG. 3B, on the hand image 308, five concentric circles (including concentric circles 310a, 310b, 310c, 310d and 310e shown in FIG. 3B) are deployed.

In the step S211, the number of the intersection points of the hand region and each of the concentric circles is calculated respectively to determine the feature vector of the gesture. It should be noticed that this feature vector comprises several components and each of the components corresponds to one of the concentric circles. More specifically, the number of the intersection points of the hand region and the concentric circle is the component corresponding to the concentric circle. In other words, along the direction away from the geometric center c of the hand region, the number of the intersection points of the hand region and each of the concentric circles together form the feature vector of the gesture. Moreover, when the circle number is k, the feature vector determined by calculating the number of the intersection points of the hand region and each of the concentric circles is a k-dimension feature vector. As shown in FIG. 3B, five concentric circles are deployed on the hand image 308 so that the feature vector of the gesture is a 5-dimension feature vector.

In addition, the number of the intersection points of the hand region and each of the concentric circles can be obtained by sequentially analyzing the pixels on the same concentric circle along a predetermined direction (such as a clockwise direction or a counter clockwise direction) and comparing the two adjacent pixels on the same concentric circle with each other. When the binary values of two adjacent pixels on the same concentric circle are different from each other, one intersection point of the hand region and the concentric circle is determined to be located at the two adjacent pixels on the same concentric circle.

The aforementioned step S205 of deploying concentric circles on the hand image is described in an embodiment in the following paragraphs. FIG. 3A is a flow chart showing a process for deploying concentric circles on the hand image according to one embodiment of the present invention. FIG. 3B is a schematic diagram showing a hand image having concentric circles deploying thereon according to one embodiment of the present invention. As shown in FIG. 3A and FIG. 3B, in the step S301, a distance between the geometric center c(xc, yc) and a wrist joint of the hand in the hand image is regarded as the maximum radius. The position of the wrist joint of the hand in the hand image can be determined by, for example, executing NITE software to analyze the skeleton of the hand in the hand image. In another embodiment, the method for determining the maximum radius comprises: in the binary image (As shown in FIG. 3B) of the hand region with the resolution n×m, the longest distance between the geometric center c(xc, yc) and each of the four sides of the n×m binary image of the hand region is regarded as the maximum radius.

Then, in the step S305, within the range corresponding to the geometric center as a center and the maximum radius, the concentric circles (such as the concentric circles 310a, 310b, 310c, 310d and 310e shown in FIG. 3B) are evenly deployed. Noticeably, the maximum radius is divided by a number of the concentric circles (the circle number) is larger than or equal to 1. More specifically, the maximum radius divided by the circle number equals the radius (the radius d shown in FIG. 3B) of the minimum concentric circle which is nearest to the geometric center c(xc, yc). Further, the rest of the concentric circles are sequentially deployed to be away from the geometric center c(xc, yc) and the radius difference between the two adjacent concentric circles is the radius (the radius d shown in FIG. 3B) of the minimum concentric circle.

The aforementioned gesture recognition shown in FIG. 1 is illustrated in the following embodiments accompanied with drawings.

Figure 4:
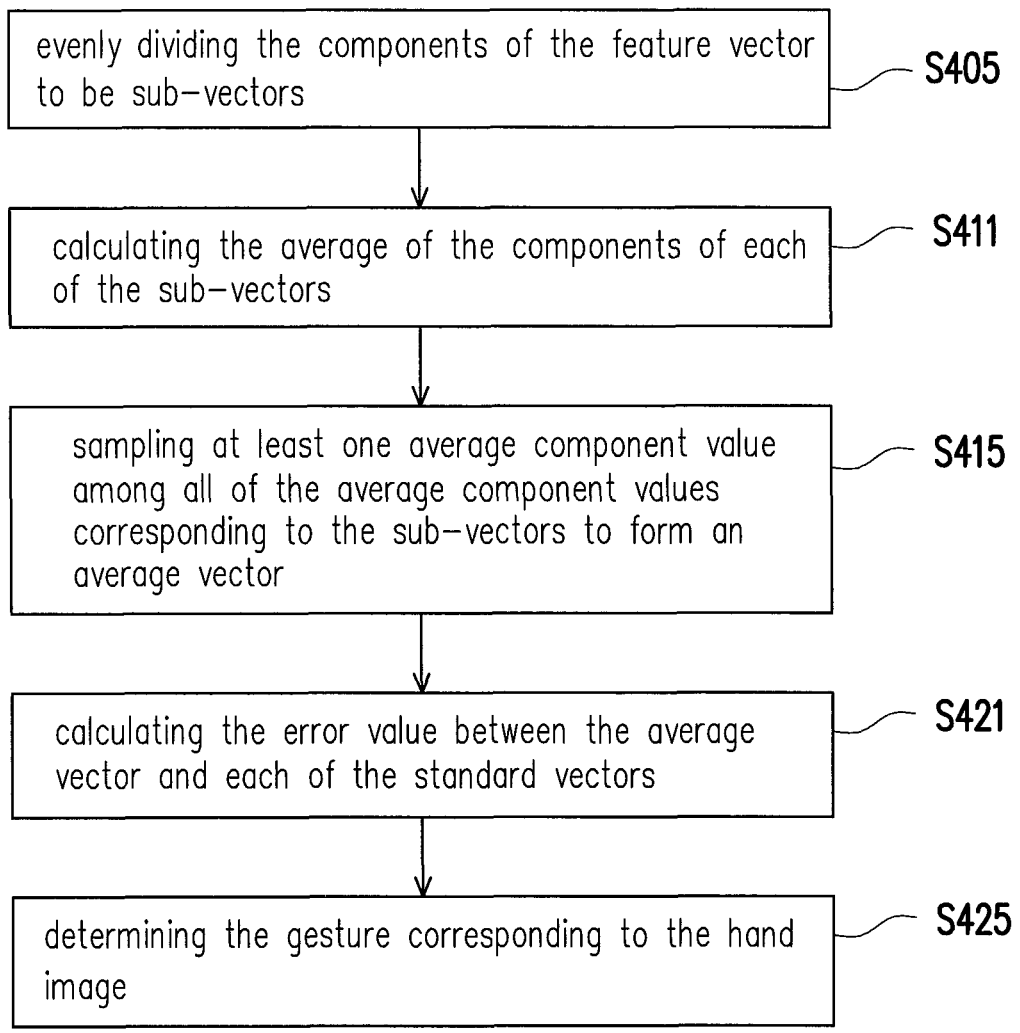
FIG. 4 is a flow chart showing a gesture recognition according to one embodiment of the present invention.

FIG. 4 is a flow chart showing a gesture recognition according to one embodiment of the present invention. As shown in FIG. 4, the gesture recognition of the present embodiment is used for an electronic device having a storage device for recording a plurality of standard gestures and a plurality of standard vectors respectively corresponding to the standard gestures. As shown in FIG. 4, in the present embodiment, there are n concentric circles deploying on the hand region (n is a positive number) and between the concentric circle with the minimum radius and the concentric circle with the maximum radius, the numbers of the intersection points of the hand region and the concentric circles form the feature vector (X1, X2, . . . , Xn). Further, in the aforementioned feature vector (X1, X2, . . . , Xn), X1 is the number of the intersection points of the hand region and the concentric circle with the minimum radius (in the vector point of view, X1 is one of the components in the feature vector). Analogously, Xn is the number of the intersection points of the hand region and the concentric circle with the maximum radius (in the vector point of view, Xn is one of the components in the feature vector). In the step S405 of the present embodiment, the components of the feature vector is evenly divided to form several sub-vectors. For instance, using twenty percentage of a number of the concentric circles as a dividing basis, the components X1 through Xn of the feature vector are divided to form five sub-vectors in order. That is, the number of the components in each of the sub-vectors equals to twenty percentage of the number of the concentric circles.

More specifically, from the circle labeled zero (i.e. the center of the concentric circle) to the concentric circles labeled the twenty percentage of the circle number (n), the corresponding components together form a first sub-vector (X1, ..., Xn/5). If twenty percentage of n (which is n over 5) is not a integral, the integral which is the largest among the integrals smaller than the twenty percentage of n is used to select the components form the feature vector to form the first sub-vector. Analogously, from the concentric circle labeled twenty-percent n to the concentric circle labeled forty-percent n, the corresponding components together form a second sub-vector (Xn/5+1, X2n/5). From the concentric circle labeled forty-percent n to the concentric circle labeled sixty-percent n, the corresponding components together form a third sub-vector (X2n/5+1, X3n/5). Moreover, from the concentric circle labeled sixty-percent n to the concentric circle labeled eighty-percent n, the corresponding components together form a fourth sub-vector(X3n/5+1, X4n/5). From the concentric circle labeled eighty-percent n to the concentric circle labeled one-hundred-percent n, the corresponding components together form a fifth sub-vector (X4n/5+1, ..., Xn).

In the step S411, an average of the components (i.e. average component value) of each of the sub-vectors is calculated. Taking the aforementioned set of five sub-vectors as an example, the average component values of the five sub-vectors are calculated respectively to be Y1, Y2, Y3, Y4 and Y5. The average component value of each of the sub-vectors can be obtained according to the following equations 1-5:

$$Y1 = \frac{\sum_{i=0}^{\lfloor \frac{n}{5} \rfloor} X_i}{\lfloor \frac{n}{5} \rfloor}, \text{ wherein } i \text{ is the positive integral} \quad \text{(equation 1)}$$

$$Y2 = \frac{\sum_{i=\lfloor \frac{n}{5} \rfloor+1}^{\lfloor \frac{2n}{5} \rfloor} X_i}{\lfloor \frac{2n}{5} \rfloor - \lfloor \frac{n}{5} \rfloor}, \text{ wherein } i \text{ is the positive integral} \quad \text{(equation 2)}$$

$$Y3 = \frac{\sum_{i=\lfloor \frac{2n}{5} \rfloor+1}^{\lfloor \frac{3n}{5} \rfloor} X_i}{\lfloor \frac{3n}{5} \rfloor - \lfloor \frac{2n}{5} \rfloor}, \text{ wherein } i \text{ is the positive integral} \quad \text{(equation 3)}$$

$$Y4 = \frac{\sum_{i=\lfloor \frac{3n}{5} \rfloor+1}^{\lfloor \frac{4n}{5} \rfloor} X_i}{\lfloor \frac{4n}{5} \rfloor - \lfloor \frac{3n}{5} \rfloor}, \text{ wherein } i \text{ is the positive integral} \quad \text{(equation 4)}$$

$$Y5 = \frac{\sum_{i=\lfloor \frac{4n}{5} \rfloor+1}^{n} X_i}{n - \lfloor \frac{4n}{5} \rfloor}, \text{ wherein } i \text{ is the positive integral} \quad \text{(equation 5)}$$

In the step S415, among all of the average component values corresponding to the sub-vectors, at least one average component value is sampled to form an average vector. Taking the aforementioned set of five sub-vectors as an example, three average component values of three sub-vectors are, for example, sampled to form a three-dimension average vector (Y3, Y4, Y5). Thereafter, in the step S421, by using the Euclidean distance formula, an error value d between the average vector and each of the standard vectors respectively corresponding to the standard gestures recorded in the storage device is calculated. That is, the Euclidean distance between the average vector and each of the standard vectors is calculated. Taking the distance between the point x (x1, ..., xn) and the point y (y1, ..., yn) as an example, according to the Euclidean distance formula (equation 6), the distance between the point x and the point y is:

$$d(x, y) := \sqrt{(x_1 - y_1)^2 + (x_2 - y_2)^2 + \ldots + (x_n - y_n)^2} \quad \text{(equation 6)}$$
$$= \sqrt{\sum_{i=1}^{n} (x_i - y_i)^2}$$

In the step S425, according to the error value between the average vector and each of the standard vectors, the gesture corresponding to the hand image is determined. In one embodiment, the aforementioned method for determining the gesture corresponding to the hand image comprises that, for example, when the calculated error value/Euclidean distance between the average vector and one of the standard vectors is smaller than a predetermined value (such as a predetermined range between positive two and negative two), the standard gesture corresponding to this standard vector is regarded as the gesture corresponding to the average vector. Furthermore, in another embodiment, the aforementioned method for determining the gesture corresponding to the hand image, for example, comprises comparing the calculated error values/Euclidean distances between the average vector and the standard vectors with each other. When one of the error values/Euclidean distances between the average vector and the standard vectors is the minimum, the standard gesture corresponding to this standard vector is regarded as the gesture corresponding to the average vector.

Figure 6:
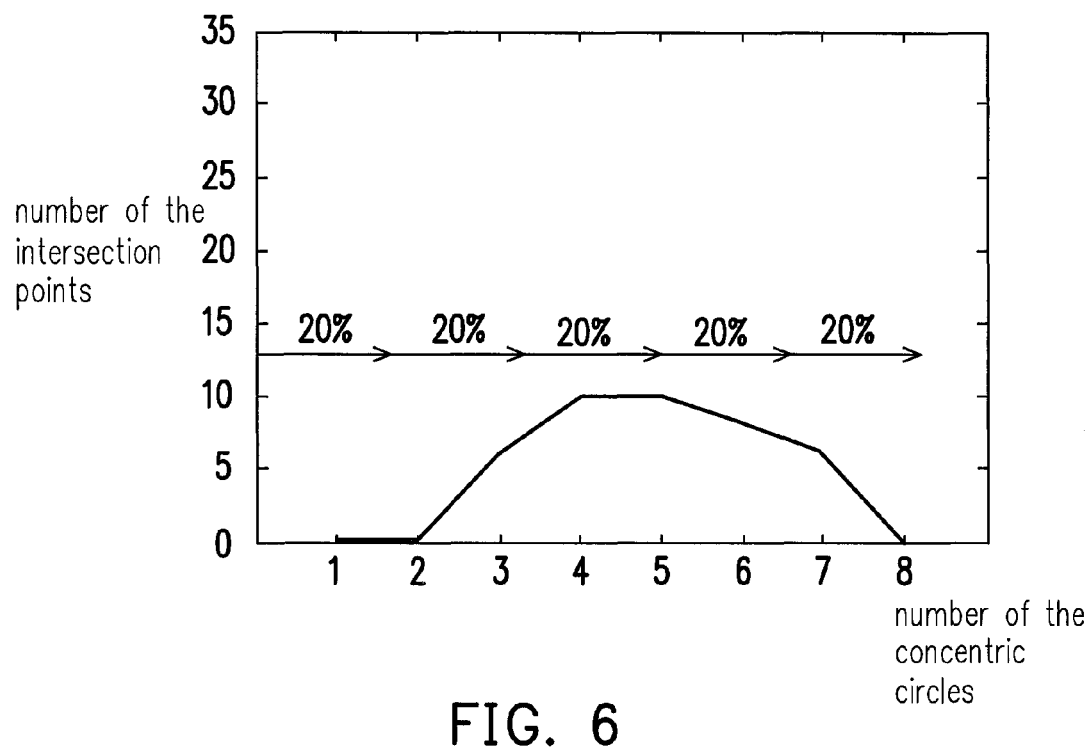
FIG. 6 is a plot diagram showing a relationship between the number of the intersection points and the order of the concentric circles.

The steps for forming the feature vector by the number of the intersection points of the hand region and each of the concentric circles and calculating the error value between the average vector and each of the standard vectors which are mentioned in the gesture recognition method in the above embodiment are further described in the following embodiment shown in FIG. 6. FIG. 6 is a plot diagram showing a relationship between the number of the intersection points and the order of the concentric circles. In FIG. 6, there are 8 concentric circles deployed on the hand image, and the feature vector of the gesture in which the components are arranged from being corresponding to the innermost concentric circle 1 (i.e. the concentric circle has the minimum radius) to being corresponding to the outermost concentric circle 8 (i.e. the concentric circle has the maximum radius) is, for example, (0, 0, 6, 10, 10, 8, 6, 0).

Thereafter, taking the component which is 0 and is corresponding to the concentric circle 1 as an example, the components between the component corresponding to the concentric circle 1 (i.e. the innermost concentric circle with the minimum radius) and the component corresponding to the concentric circle 8 (i.e. the outermost concentric circle with the maximum radius) are evenly divided into several group (as the step S405 shown in FIG. 4). For instance, from the concentric circle corresponding to the minimum radius to the concentric circle corresponding to the maximum radius, every twenty percentage of the number of the concentric circles are grouped into one group. More specifically, as shown in FIG. 6, the twenty percentage of eight concentric circles is 1.6 concentric circles. Hence, the components corresponding to every 1.6 concentric circles in the feature vector are sequentially grouped to form sub-vectors.

Moreover, an average component value of each of the sub-vectors is calculated. Taking the feature vector (0, 0, 6, 10, 10, 8, 6, 0) corresponding to the gesture as an example, the average component value of the sub-vector having components corresponding to the concentric circles 0 through 1.6 is 0, the average component value of the sub-vector having components corresponding to the concentric circles 1.7 through 3.2 is 3, the average component value of the sub-vector having components corresponding to the concentric circles 3.3 through 4.8 is 10, the average component value of the sub-vector having components corresponding to the concentric circles 4.9 through 6.4 is 9, and the average component value of the sub-vector having components corresponding to the concentric circles 6.5 through 8 is 3 (the step S411 shown in FIG. 4). In this embodiment, the average component values of the last three sub-vectors together form the average vector (10, 9, 3) (the step S415 shown in FIG. 4). Then, the error value (i.e. the Euclidean distance) between the average vector and each of the standard vectors is calculated (the step S421 shown in FIG. 4).

Figure 5:
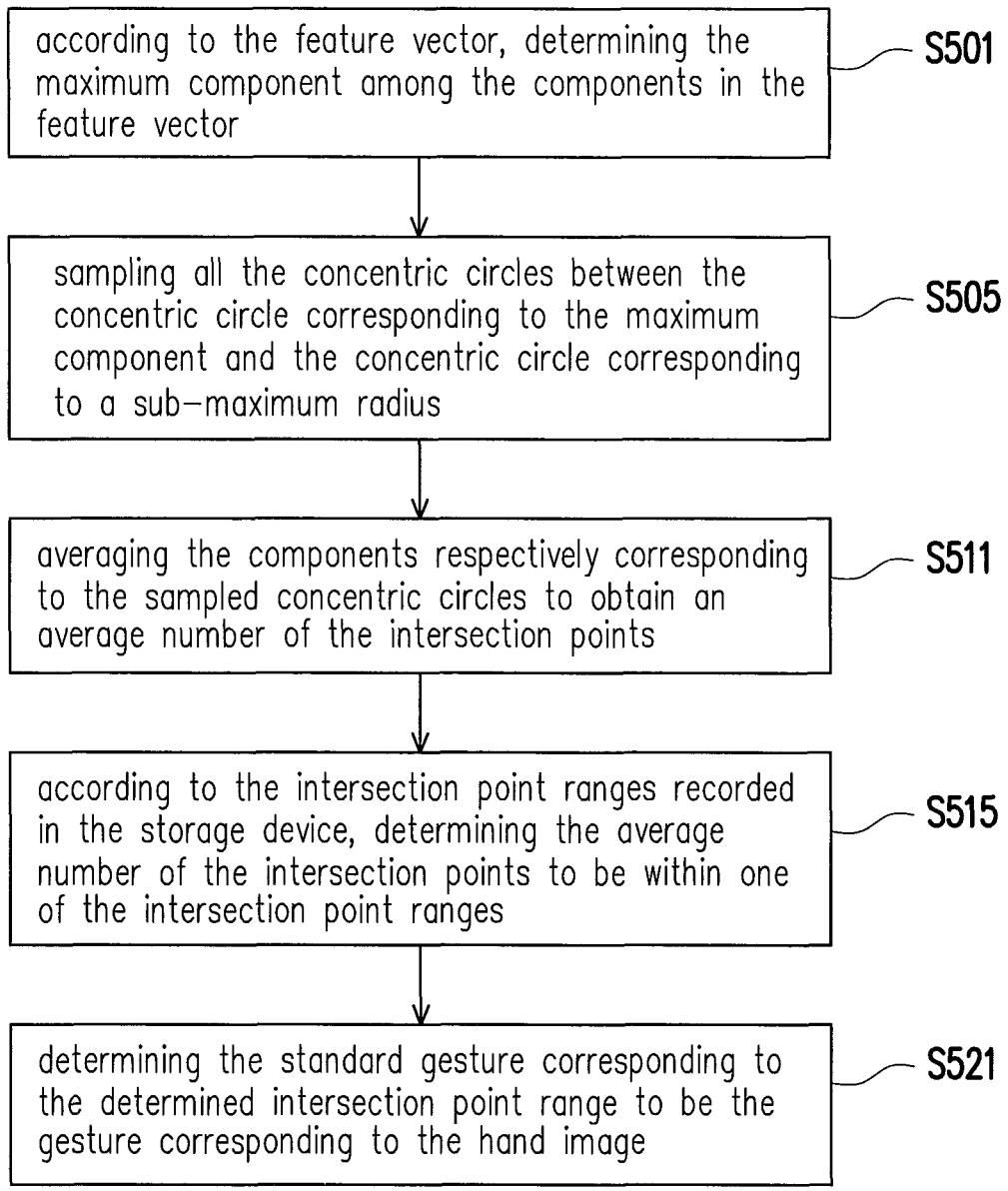
FIG. 5 is a flow chart showing a gesture recognition according to another embodiment of the present invention.

FIG. 5 is a flow chart showing a gesture recognition according to another embodiment of the present invention. As shown in FIG. 5, the gesture recognition of the present embodiment is used by an electronic device which equipped with a storage device for recording several standard gestures and the number of the intersection point ranges respectively corresponding to the standard gestures. In the step S501, according to the feature vector, the maximum component among the components in the feature vector is determined. For instance, when there are n concentric circles deployed on the hand region (n is the natural number), the feature vector composed of the number of the intersection points of the hand region and each of the concentric circles is $(X1, X2, \ldots, Xn)$. X1 is the number of the intersection points of the hand region and the concentric circle with the minimum radius. Analogously, Xn is the number of the intersection points of the hand region and the concentric circle with the maximum radius. Therefore, from component X1 to component Xn in the feature vector (X1, X2, ..., Xn), the maximum component is determined. When there is more than one maximum components, the maximum component which is closer to component X1 according to the order from the component X1 to the component Xn is determined to be the ultimate maximum component. In other words, for instance, there are three maximum components which are components Xi, Xj and Xk in the feature vector (X1, X2, ..., Xn) and i, j and k respectively represent the orders of the components Xi, Xj and Xk, wherein i, j and k are all natural numbers, i, j and k are larger than 1 and smaller or equal to n, i is smaller than j and j is smaller than k. Therefore, the component Xi is regarded as the maximum component in the feature vector (X1, X2, ..., Xn).

In the step S505, all the concentric circles between the concentric circle corresponding to the maximum component and the concentric circle corresponding to a sub-maximum radius are sampled. The aforementioned sub-maximum radius is only smaller than the maximum radius. That is, the sub-maximum radius is only smaller than the maximum radius which is the distance between the geometric center and the wrist joint of the hand in the hand image. More specifically, the circle area corresponding to the sub-maximum radius is only smaller than the circle area corresponding to the maximum radius. Taking the maximum component Xi of the feature vector (X1, X2, ..., Xn) as an example, the concentric circles between the concentric circle corresponding to the Xi and the concentric circle corresponding to the Xn−1 are sampled.

Then, in the step S511, the components respectively corresponding to the sampled concentric circles are averaged to obtain an average number of the intersection points. Taking the maximum component Xi of the feature vector (X1, X2, ..., Xn) as an example, the average number Y is calculated by averaging the component Xi to the component Xn−1 according to the equation 7 shown below:

$$Y = \frac{\sum_{s=i}^{n-1} Xs}{n-i} \qquad \text{(equation 7)}$$

In the step S515, according to the intersection point ranges recorded in the storage device, the average number of the intersection points is determined to be within one of the intersection point ranges. In the step S521, the standard gesture corresponding to the determined intersection point range is determined to be the gesture corresponding to the hand image.

Taking the embodiment having eight concentric circles and shown in FIG. 6 as an example, as shown in FIG. 6, the feature vector of the gesture is (0, 0, 6, 10, 10, 8, 6, 0) and the maximum component corresponding to the concentric circle 4 is 10 (i.e. the number of the intersection points is 10) (the step S501 shown in FIG. 5). Then, all concentric circles between the concentric circle 4 and the concentric circle 7 (which is the concentric circle corresponding to the sub-maximum radius) are sampled (the step S505 shown in FIG. 5). That is, the components 10, 10, 8 and 6 respectively corresponding to concentric circles 4 through 7 are sampled. Further, the components respectively corresponding to the sampled concentric circles are averaged to obtain the average number of the intersection points which is 8.5 (that is, 34, which is the sum of 10, 10, 8 and 6, divided by 4 equals to 8.5) (the step S511 shown in FIG. 5).

Figure 7:
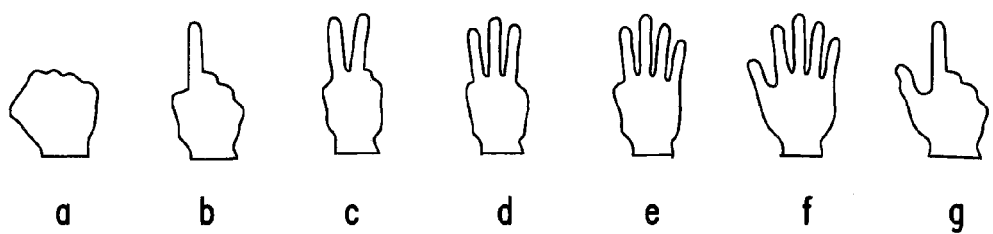
FIG. 7 is a schematic diagram showing a portion of the gestures.

Furthermore, in the present embodiment, the intersection point ranges recorded in the storage device comprise: the intersection point range larger than zero and smaller than or equal to 2 is corresponding to the gesture a (the gesture a shown in FIG. 7), the intersection point range larger than 2 and smaller than or equal to 4 is corresponding to the gesture b (the gesture b shown in FIG. 7), the intersection point range larger than 4 and smaller than or equal to 6 is corresponding to the gesture c (the gesture c shown in FIG. 7), the intersection point range larger than 6 and smaller than or equal to 8 is corresponding to the gesture d (the gesture d shown in FIG. 7), the intersection point range larger than 8 and smaller than or equal to 10 is corresponding to the gesture e (the gesture e shown in FIG. 7), and the intersection point range larger than 10 and smaller than or equal to 12 is corresponding to the gesture f (the gesture f shown in FIG. 7). Therefore, in FIG. 6, when the average number of intersection points which is 8.5 is within the intersection point range (the intersection point range is larger than 8 and smaller than or equal to 10) corresponding to the gesture e, the gesture corresponding to the hand region is determined to be the gesture e (as shown in FIG. 7) (the step S521 shown in FIG. 5).

In the present invention, the feature differences between different gestures are found out by calculating the number of the intersection points of the hand region and each of the concentric circles. For instance, referring to the schematic diagrams (binary images) respectively showing the frequently used gestures in FIG. 7, when more fingers are used in a gesture (such as the gesture f for frequently representing five), the number of the intersection points of the hand region and each of the concentric circles is large. In addition, when less finger are used in a gesture (such as the gesture a), the number of the intersection points of the hand region and each of the concentric circles is small. Moreover, although both gesture c and gesture g use two fingers to express meanings, different finger length leads to different numbers of the intersection points between the concentric circles corresponding to the same radius and respectively deployed on different hand images (that is, even the gestures using the same number of fingers to express meanings, the feature vectors respectively corresponding to the gestures are different from each other). Thus, the feature vectors can be accordingly told from each other.

The gesture recognition method of the present invention can be implemented by an electronic device. The electronic device capable of implementing the gesture recognition method of the present invention is described accompanied with drawings in the following paragraphs.

Figure 8:
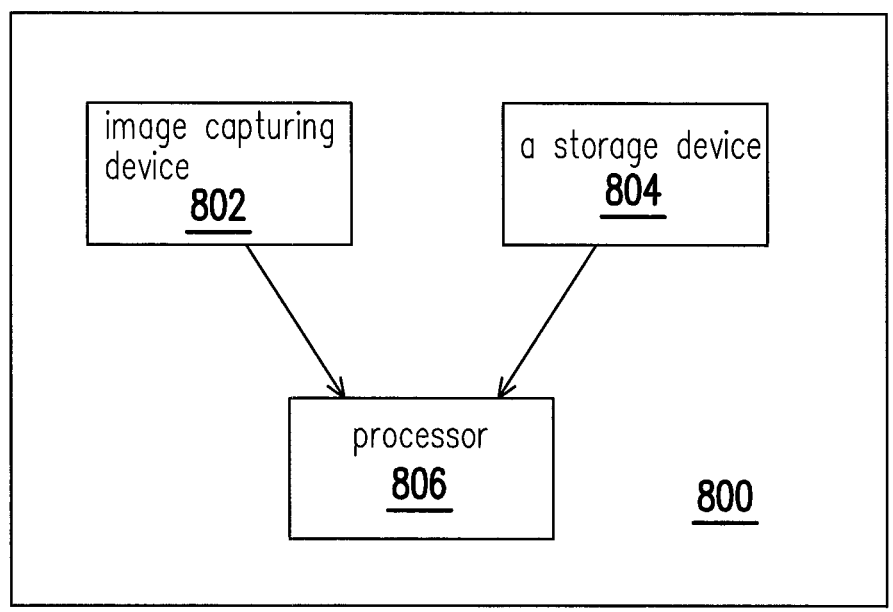
FIG. 8 is a schematic diagram showing an electronic device according to one embodiment of the present invention.

FIG. 8 is a schematic diagram showing an electronic device according to one embodiment of the present invention. As shown in FIG. 8, the electronic device 800 comprises an image capturing device 802, a storage device 804 and a processor 806. The image capturing device 802 captures a hand image of at least one hand. The hand image includes a hand region. The way to obtain the hand region is detailed in the previous embodiment and is not further described herein. The storage device 804 stores a computer readable and writable software. Further, the storage device 804 records a plurality of standard gestures and a plurality of standard vector respectively corresponding to the standard gestures or a plurality of intersection point ranges respectively corresponding to the standard gestures. The processing unit 806 executes a plurality of commands of the computer readable and writable software. These commands includes the step of performing the hand feature operation (step S105, steps S201~S211 and steps S301~S305) and the step of performing the gesture recognition (step S111, steps S405~S425 or steps S501~S521). The commands executed by the processing unit 806 are described in the previous embodiment and are not detailed herein.

Altogether, the concentric circles are deployed on the hand region of the gesture in the present invention. According to the number of the intersection points of the hand region and each of the concentric circles, the feature vector corresponding to the actual gesture is determined. Then, by using the feature vector, the gesture is recognized. Comparing with the conventional method in which a longest distance between the geometric center of the hand region and each of the points at the edge of the hand region in 360 degrees is calculated and the feature vector is obtained according to the data of the longest distances, the feature vector of the present invention represents the feature of the gesture, which is capable of simplifying the complexity of the data processing. Thus, the instantaneity of the human-computer interaction can be improved.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A gesture recognition method for an electronic device to recognize a gesture of at least a hand, the gesture recognition method comprising:
    capturing a hand image of the hand, wherein the hand image includes a hand region;
    calculating a geometric center of the hand region;
    deploying at least a concentric circle on the hand image with the geometric center as a center of the concentric circles;
    counting the number of a plurality of intersection points of the edge of the hand region on each of the concentric circles respectively to determine a feature vector of the gesture; and
    according to the feature vector, performing a hand recognition to recognize the gesture of the hand.

2. The gesture recognition method of claim 1, wherein the step of deploying the concentric circles on the hand image comprises:
    regarding a distance between the geometric center and a wrist joint of the hand in the hand image as a maximum radius; and
    evenly deploying the concentric circles within a range corresponding to the maximum radius with the geometric center as the center, wherein the maximum radius divided by a number of the concentric circles is larger than or equal to 1.

3. The gesture recognition method of claim 1, wherein the feature vector includes a plurality of components and each of the components corresponds to one of the concentric circles and the number of the intersection points of the concentric circle to the hand region is equal to the component corresponding to the concentric circle.

4. The gesture recognition method of claim 3, wherein the electronic device comprises a storage device recording a plurality of standard gestures and a plurality of standard vectors respectively corresponding to the standard gestures, and the gesture recognition comprises:
    evenly dividing the components in the feature vector to form a plurality of sub-vectors;
    calculating an average component value of each of the sub-vectors;
    sampling at least one of the average component values respectively corresponding to the sub-vectors to form an average vector;
    calculating an error value between the average vector and each of the standard vectors; and
    according to the error values, determining the gesture corresponding to the hand image.

5. The gesture recognition method of claim 4, wherein the step of evenly dividing the components in the feature vector comprises:
    using twenty percentage of a number of the concentric circles as a dividing basis, evenly dividing the components in the feature vector to respectively form the sub-vectors.

6. The gesture recognition method of claim 3, wherein the electronic device comprises a storage device and the storage device records a plurality of standard gestures and a plurality of intersection point ranges respectively corresponding to the standard gestures, and the gesture recognition comprises:
    according to the feature vector, determining a maximum component among the components in the feature vector;
    sampling all concentric circles between the concentric circle corresponding to the maximum component and the concentric circle corresponding to a sub-maximum radius, wherein the sub-maximum radius is only smaller than a maximum radius which is a distance between the geometric center and a wrist joint of the hand in the hand image;

averaging the components respectively corresponding to the sampled concentric circles to obtain an average number of the intersection points;

according to the intersection point ranges recorded in the storage device, determining the average number of the intersection points to be within one of the intersection point ranges; and determining the standard gesture corresponding to the determined intersection point range to be the gesture corresponding to the hand image.

7. An electronic device, comprising:

an image capturing device, capturing a hand image of the hand, wherein the hand image includes a hand region;

a storage device, storing a computer readable and writable software;

a processor, executing a plurality of commands of the computer readable and writable software, wherein the commands comprises:

calculating a geometric center of the hand region;

deploying at least a concentric circle on the hand image with the geometric center as a center of the concentric circles;

counting the number of a plurality of intersection points of the edge of the hand region on each of the concentric circles respectively to determine a feature vector of the gesture; and according to the feature vector, performing a hand recognition to recognize the gesture of the hand.

8. The electronic device of claim 7, wherein the command of deploying the concentric circles on the hand image comprises:

regarding a distance between the geometric center and a wrist joint of the hand in the hand image as a maximum radius; and evenly deploying the concentric circles within a range corresponding to the maximum radius with the geometric center as the center, wherein the maximum radius divided by a number of the concentric circles is larger than or equal to 1.

9. The electronic device of claim 7, wherein the feature vector includes a plurality of components and each of the components corresponds to one of the concentric circles and the number of the intersection points of the concentric circle to the hand region is equal to the component corresponding to the concentric circle.

10. The electronic device of claim 9, wherein the storage device records a plurality of standard gestures and a plurality of standard vectors respectively corresponding to the standard gestures, and the gesture recognition comprises:

evenly dividing the components in the feature vector to form a plurality of sub-vectors;

calculating an average component value of each of the sub-vectors;

sampling at least one of the average component values respectively corresponding to the sub-vectors to form an average vector;

calculating an error value between the average vector and each of the standard vectors; and according to the error values, determining the gesture corresponding to the hand image.

11. The electronic device of claim 10, wherein the command of evenly dividing the components in the feature vector comprises:

using twenty percentage of a number of the concentric circles as a dividing basis, evenly dividing the components in the feature vector to respectively form the sub-vectors.

12. The electronic device of claim 9, wherein the storage device records a plurality of standard gestures and a plurality of intersection point ranges respectively corresponding to the standard gestures, and the gesture recognition comprises:

according to the feature vector, determining a maximum component among the components in the feature vector;

sampling all concentric circles between the concentric circle corresponding to the maximum component and the concentric circle corresponding to a sub-maximum radius, wherein the sub-maximum radius is only smaller than a maximum radius which is a distance between the geometric center and a wrist joint of the hand in the hand image;

averaging the components respectively corresponding to the sampled concentric circles to obtain an average number of the intersection points;

according to the intersection point ranges recorded in the storage device, determining the average number of the intersection points to be within one of the intersection point ranges; and determining the standard gesture corresponding to the determined intersection point range to be the gesture corresponding to the hand image.

* * * * *